US009590718B1

(12) United States Patent
Subramanyam et al.

(10) Patent No.: US 9,590,718 B1
(45) Date of Patent: Mar. 7, 2017

(54) END-TO-END WIRELESS CONNECTIVITY BETWEEN VEHICLE AND REMOTE SERVER USING WIRELESS RADIOS OF TWO MOBILE DEVICES

(71) Applicant: Honeywell International Inc., Morristown, NJ (US)

(72) Inventors: Rajesh Vecham Subramanyam, Karnataka (IN); Preetham Keerthi Raveendra, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/861,286

(22) Filed: Sep. 22, 2015

(51) Int. Cl.
*H04B 7/15* (2006.01)
*H04B 7/155* (2006.01)
*H04W 76/02* (2009.01)
*H04B 1/3822* (2015.01)
*H04B 1/3827* (2015.01)
*H04L 29/08* (2006.01)
*H04W 4/00* (2009.01)
*H04W 88/06* (2009.01)
*H04W 84/12* (2009.01)

(52) U.S. Cl.
CPC ............ *H04B 7/155* (2013.01); *H04B 1/385* (2013.01); *H04B 1/3822* (2013.01); *H04L 67/12* (2013.01); *H04W 4/008* (2013.01); *H04W 76/023* (2013.01); *H04B 2001/3866* (2013.01); *H04W 84/12* (2013.01); *H04W 88/06* (2013.01)

(58) Field of Classification Search
USPC ...................... 455/41.1–41.3, 550.1, 552.1, 7
See application file for complete search history.

(56) References Cited

U.S. PATENT DOCUMENTS 7,903,594 B1    3/2011   Marmur et al.
8,082,317 B2   12/2011   Loda
8,401,464 B2 *  3/2013   Wang ..................... H04B 7/155
                                                    455/7

(Continued)

FOREIGN PATENT DOCUMENTS

WO        2015013307        1/2015

OTHER PUBLICATIONS

Anandappan et al., "A Method & System to Transfer Data to/From Aircraft Using Mobile Application", Jul. 22, 2013, pp. 1-6, Publisher: ip.com, Published in: US.

(Continued)

*Primary Examiner* — Fayyaz Alam
(74) *Attorney, Agent, or Firm* — Fogg & Powers LLC

(57) ABSTRACT

A system includes a first mobile device having a first wireless radio and a second wireless radio; a second mobile device having a third wireless radio and a fourth wireless radio; wherein the first wireless radio of the first mobile device is configured to communicate wirelessly with the third wireless radio of the second mobile device; wherein the third wireless radio of the second mobile device is configured to communicate wirelessly with the first wireless radio of the first mobile device; wherein the second wireless radio of the first mobile device is configured to communicate at least in part wirelessly with a central maintenance computer of a vehicle; and wherein the fourth wireless radio of the second mobile device is configured to communicate at least in part wirelessly with a remote server.

20 Claims, 5 Drawing Sheets

(56) References Cited

U.S. PATENT DOCUMENTS

| | | |
|---|---|---|
| 8,856,277 B2 | 10/2014 | Saugnac |
| 2007/0115938 A1 | 5/2007 | Conzachi et al. |
| 2010/0131149 A1 | 5/2010 | Saugnac et al. |
| 2010/0198431 A1 | 8/2010 | Corbefin |
| 2011/0218701 A1 | 9/2011 | Ric et al. |
| 2015/0148022 A1* | 5/2015 | Bhargava ............ H04B 7/00 455/418 |
| 2016/0081008 A1* | 3/2016 | Kuhlmann ......... H04B 7/18508 455/552.1 |

OTHER PUBLICATIONS

Wei et al., "Design on Intelligent Maintenance Device in Large Craft", "ICCP2011 Proceedings", at least as early as Dec. 2011, pp. 514-517, Publisher: IEEE, Published in: US.

* cited by examiner

US 9,590,718 B1

END-TO-END WIRELESS CONNECTIVITY BETWEEN VEHICLE AND REMOTE SERVER USING WIRELESS RADIOS OF TWO MOBILE DEVICES

BACKGROUND

During aircraft and other vehicle maintenance, technicians connect to aircraft/vehicle networks onboard aircraft/vehicle to retrieve relevant maintenance data.

SUMMARY

A system includes a first mobile device having a first wireless radio and a second wireless radio; a second mobile device having a third wireless radio and a fourth wireless radio; wherein the first wireless radio of the first mobile device is configured to communicate wirelessly with the third wireless radio of the second mobile device; wherein the third wireless radio of the second mobile device is configured to communicate wirelessly with the first wireless radio of the first mobile device; wherein the second wireless radio of the first mobile device is configured to communicate at least in part wirelessly with a central maintenance computer of a vehicle; and wherein the fourth wireless radio of the second mobile device is configured to communicate at least in part wirelessly with a remote server.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
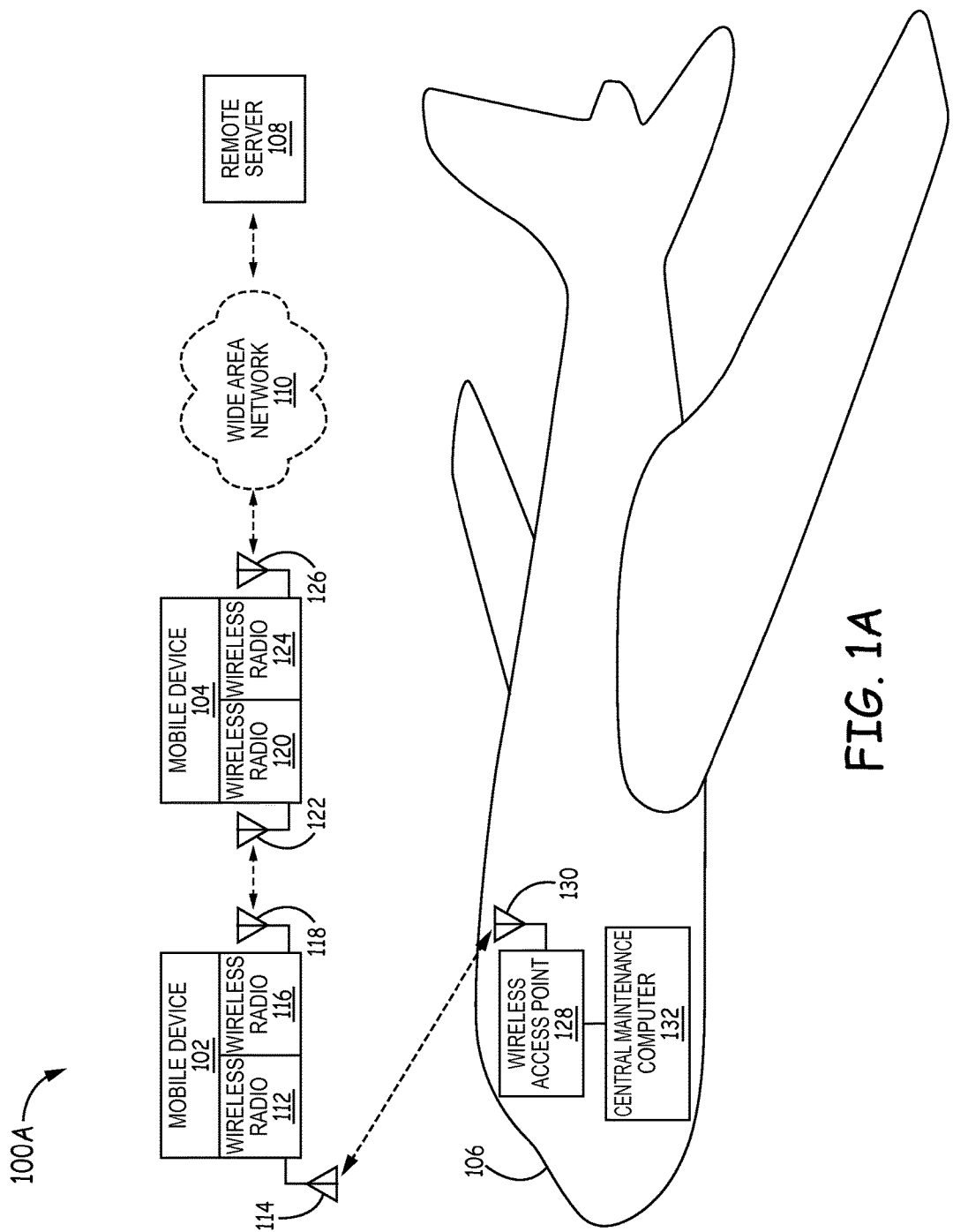
FIGS. 1A-1D are block diagrams depicting exemplary embodiments of a system for communicating maintenance information from a central maintenance computer onboard an aircraft/vehicle to a remote server using two mobile devices communicatively coupled together.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

In exemplary embodiments, the maintenance data retrieved by technicians during aircraft/vehicle maintenance is in a raw, encoded, un-formatted, and/or compressed format. In exemplary embodiments, in order to view the data, internet connectivity to connect to a remote server is required. In exemplary embodiments, the maintenance engineer goes into the aircraft/vehicle cockpit to retrieve any maintenance information (as raw, encoded, un-formatted, and/or compressed data) from the cockpit for analysis during the maintenance routine. The maintenance engineer then goes to the maintenance center to decode the maintenance information and returns to the aircraft/vehicle to perform any actions based on the decoded maintenance information. The maintenance routine typically happens every time a flight lands and before the next take off. In exemplary embodiments, it is not possible to establish connectivity with the aircraft/vehicle and the remote server simultaneously using a single piece of maintenance equipment. In these embodiments, to connect and retrieve data from these two different networks (the aircraft/vehicle network and the ground network), an intermediate step of switching from one network to another network is required. The switching time between networks causes delays in the normal work flow of the technicians which impacts the efficiency of the maintenance.

In exemplary embodiments, two separate mobile devices (such as a handheld mobile device (such as a tablet, phone, etc.) and/or a head-mounted device (such as an augmented reality headset) or other hands-free device with two different wireless radios are communicatively coupled to each other while each is also communicatively coupled to one of the two different networks. This enables seamless connection with both networks simultaneously, thereby removing the time taken for switching between networks for accessing the data and enabling continuous transfer of the data and/or commands between the two networks simultaneously. In exemplary embodiments, the two separate mobile devices complements each other in order to provide end-to-end connectivity between an aircraft/vehicle and a remote server (such as a ground server).

FIGS. 1A-1D are block diagrams depicting exemplary embodiments of a system 100 for communicating maintenance information from a central maintenance computer 132 onboard an aircraft 106 (or other vehicle) to a remote server 108 using two mobile devices 102 and 104 communicatively coupled together. Each of FIGS. 1A-1D illustrates a different embodiment of a system 100, labeled 100A-100D. While any of the systems described herein (including system 100 and systems 100A-100D) may be implemented on aircraft (including jets, planes, helicopters, un-manned drones, blimps, and balloons), they can also be implemented onboard other vehicles, such as space vehicles, sea vessels (including ships and submersibles), and ground vehicles; missiles, rockets, and other ballistics and projectiles; or integrated in other ways and for other uses.

FIG. 1A is a block diagram depicting an exemplary embodiment of a system 100, system 100A. System 100A includes a mobile device 102, a mobile device 104, an aircraft 106 (or other vehicle), and a remote server 108. The remote server 108 is communicatively coupled to the mobile device 104 via a wide area network 110 (such as the Internet).

In exemplary embodiments, the mobile device 102 is either a handheld mobile device (such as a tablet, phone, etc.) or a head-mounted mobile device (such as an augmented reality headset). In exemplary embodiments, the mobile device 102 includes a wireless radio 112 connected to an antenna 114 and a wireless radio 116 connected to a antenna 118. In exemplary embodiments, the wireless radio 112 is a Wi-Fi radio, though it could also be another type of wireless radio. In exemplary embodiments, the wireless radio 116 is a Bluetooth radio, though it could also be another type of wireless radio. In exemplary embodiments, the wireless radio 112 is a longer range radio (such as used in a wireless local area network) than the wireless radio 116 (such as a wireless personal area network). In exemplary embodiments, the types of wireless radios are selected such that the wireless radio 112 can work in parallel with the wireless radio 116.

In exemplary embodiments, the mobile device 104 includes a third wireless radio 120 connected to a third antenna 122 and a fourth wireless radio 124 connected to a fourth antenna 126. In exemplary embodiments, the wireless radio 120 is a Bluetooth radio, though it could also be another type of wireless radio. In exemplary embodiments, the wireless radio 124 is a cellular radio access technology radio configured to establish a cellular data connection (mobile internet) of sufficient speeds with the remote server. In exemplary embodiments, the cellular radio access technology includes at least one of Personal Communication Services (PCS), Specialized Mobile Radio (SMR) services, Enhanced Special Mobile Radio (ESMR) services, Advanced Wireless Services (AWS), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), or other appropriate communication services. In exemplary embodiments, the wireless radio 124 is a WiFi radio configured to communicate with a wireless local area network that communicates with the remote server, rather than the wide area network 110. In exemplary embodiments, the aircraft 106 (or other vehicle) includes a wireless access point 128 (connected to a fifth antenna 130) and a central maintenance computer 132. In exemplary embodiments, the wireless access point 128 is a Wi-Fi access point, though it could also be another type of wireless radio.

In exemplary embodiments, the mobile device 104 is either a handheld mobile device (such as a tablet, phone, etc.) or a head-mounted mobile device (such as an augmented reality headset). In exemplary embodiments, the wireless radio 112 of the mobile device 102 is configured to communicate using the antenna 114 with the wireless access point 128 of the aircraft 106 (or other vehicle). Similarly, the wireless radio access point 128 of the aircraft 106 (or other vehicle) is configured to communicate using the antenna 130 with the wireless radio 112 of the mobile device 102. In exemplary embodiments, the wireless radio 116 of the mobile device is configured to communicate using the antenna 118 with the wireless radio 120 of the mobile device 104.

In exemplary embodiments, the wireless radio 120 of the mobile device 104 is configured to communicate using the antenna 122 with the wireless radio 116 of the mobile device 102. In exemplary embodiments, the wireless radio 124 of the mobile device 104 is configured to communicate with the remote server 108 through the wide area network 110 using the antenna 126. In exemplary embodiments, the remote server 108 is configured to communicate with the wireless radio 124 of the mobile device through the wide area network 110.

An end-to-end path is established from the central maintenance computer 132 of the aircraft 106 (or other vehicle) to the remote server 108 through the mobile device 102 and the mobile device 104 using wireless radios. In exemplary embodiments, the wireless radio 116 of mobile device 102 is wirelessly paired with the wireless radio 120 of the mobile device 104 to establish a seamless datalink between the mobile device 102 and mobile device 104 enabling the combination of the mobile devices to be the bridge between data from the central maintenance computer 132 and the remote server 108. Accordingly, the raw, encoded, unformatted, and/or compressed data received form the central maintenance computer at the mobile device 102 can be passed through mobile device 104 and wide area network 110 to the remote server 108 for decoding. Then, the remote server 108 passes the decoded data back through the wide area network 110 to the mobile device 104, where it may be passed back to the mobile device 102. In exemplary embodiments, either mobile device 102 and/or mobile device 104 provides data to the user and/or instructs the user to perform various tasks based on the decoded data received from the remote server 108.

In exemplary embodiments, an integrated application and/or applications runs on mobile device 102 and/or mobile device 104. In exemplary embodiments, the integrated application(s) running on both mobile device 102 and mobile device 104 display different information on each device. In exemplary implementations one of the mobile devices displays step-by-step actions for the user, while the other mobile device displays architecture diagrams. In other implementations, other distinct information is displayed on each of mobile device 102 and mobile device 104.

In exemplary embodiments, only control action information rather than all the actual data is transferred between mobile device 102 and mobile device 104. Accordingly, only the control actions that are required to be decoded are transferred between the mobile device 102 and the mobile device 104. In exemplary embodiments, data is only sent in its encoded format from the central maintenance computer 132 to the remote server 108 and not sent once decoded back to the mobile device 104, mobile device 102, and/or central maintenance computer 132. This can be useful when the connection between the mobile device 102 and the mobile device 104 is low bandwidth, such as with a Bluetooth protocol connection. Also, this is useful at providing an additional layer of security based on proximity because Bluetooth connections (and other personal area network connections) have a short range relative to WiFi. Accordingly, a device would need to be in close proximity to attempt to intercept the communication between the mobile device 102 and the mobile device 104.

Figure 1B:
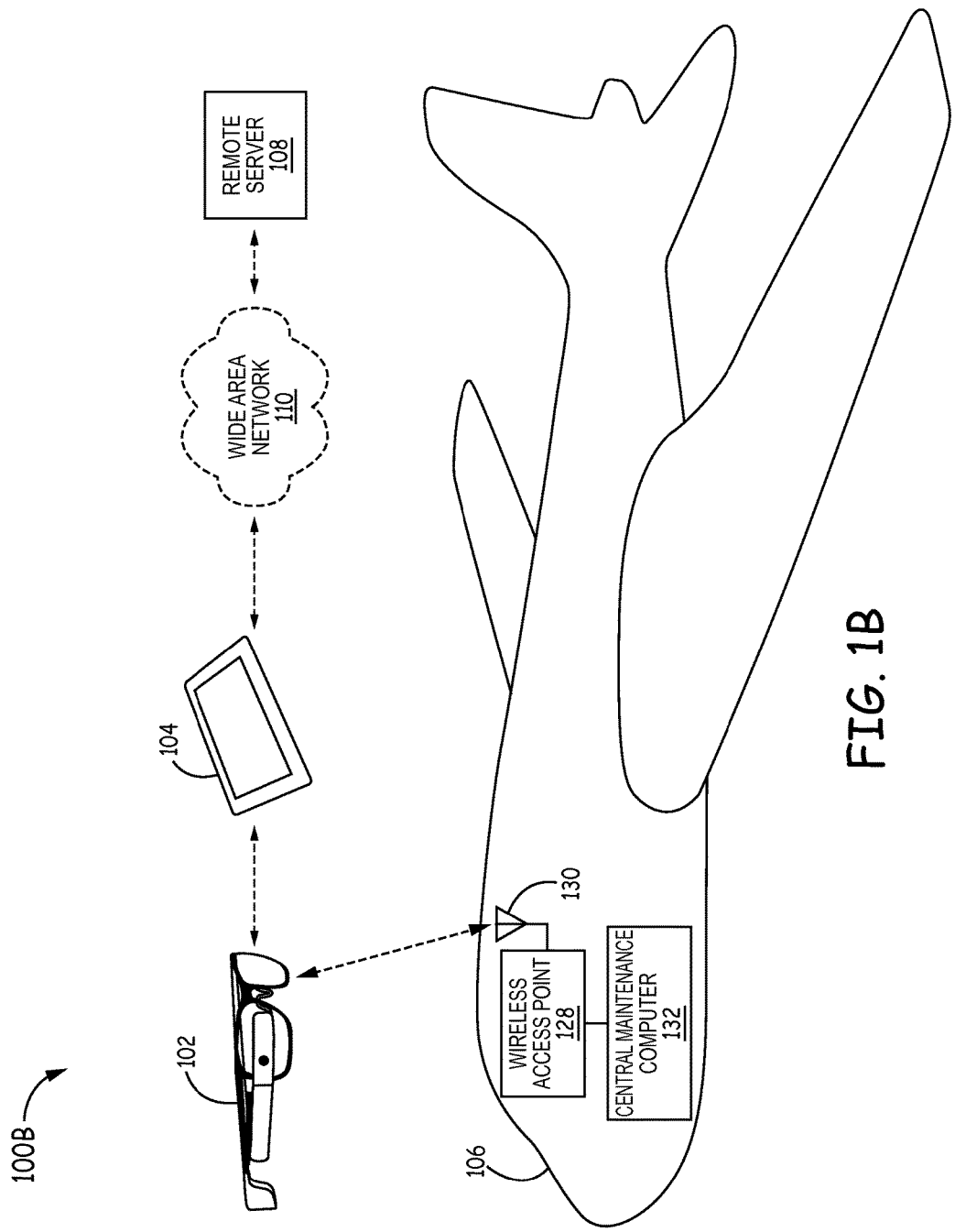

FIG. 1B is a block diagram depicting an exemplary embodiment of a system 100, system 100B. System 100B is a specific embodiment of system 100A where the mobile device 102 is a head-mounted mobile device (such as an augmented reality headset) and the mobile device 104 is a handheld mobile device (such as a tablet, phone, etc.). System 100B includes similar components to system 100A and operates according to similar principles and methods as system 100A described above.

Figure 1C:
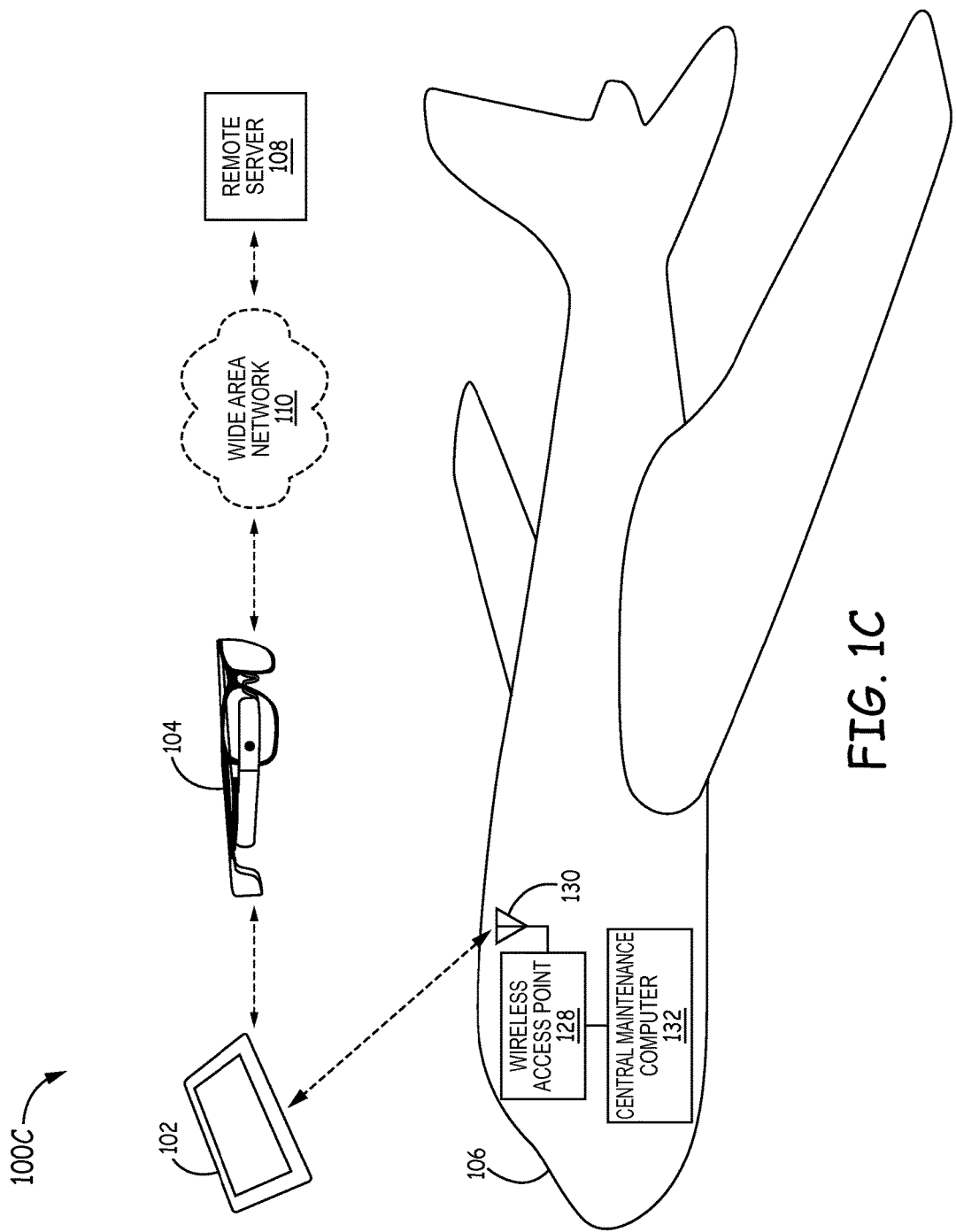

FIG. 1C is a block diagram depicting an exemplary embodiment of a system 100, system 100C. System 100C is a specific embodiment of system 100A where the mobile device 102 is a handheld mobile device (such as a tablet, phone, etc.) and the mobile device 104 is a head-mounted mobile device (such as an augmented reality headset). System 100C includes similar components to system 100A and operates according to similar principles and methods as system 100A described above.

Figure 1D:
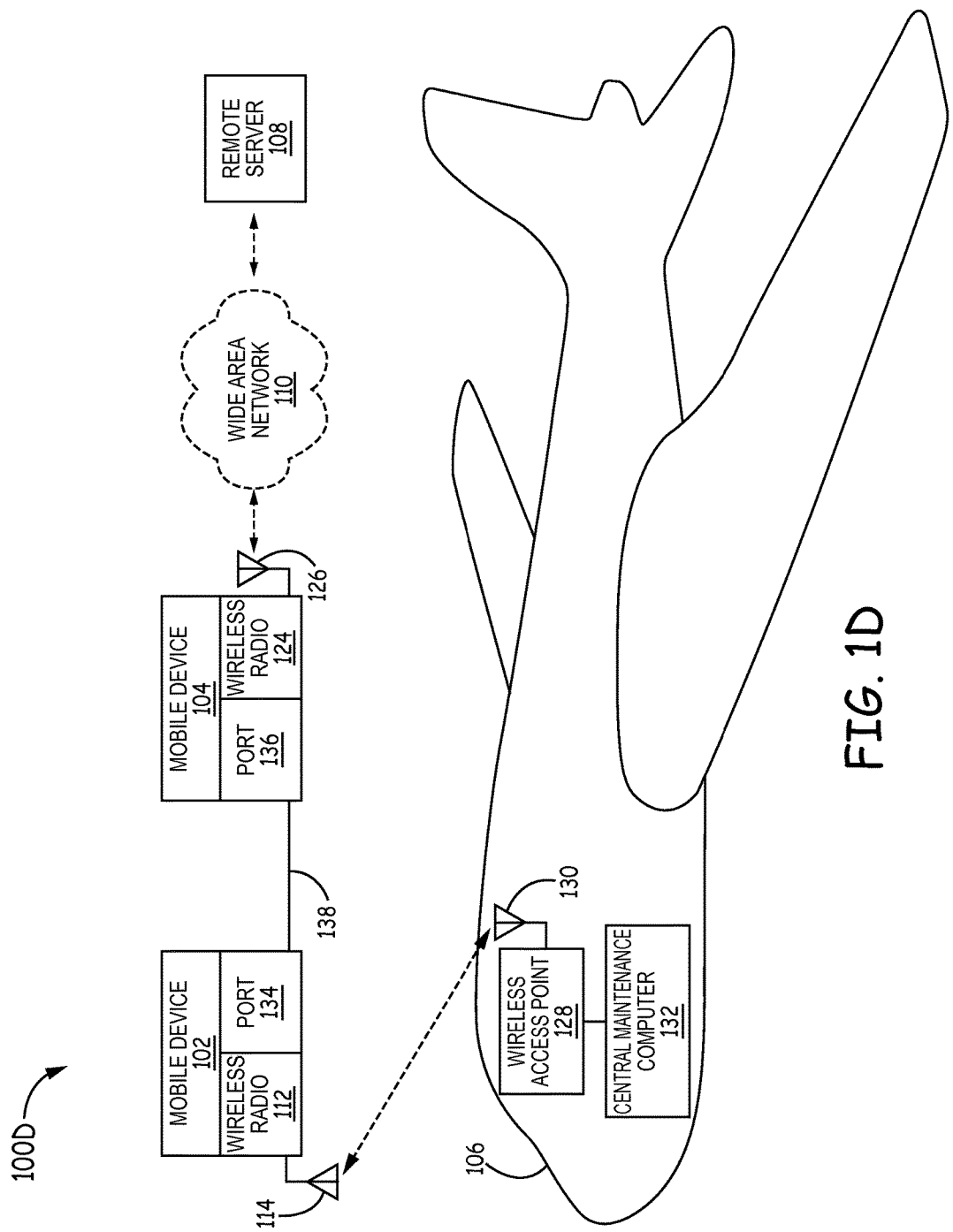

FIG. 1D is a block diagram depicting an exemplary embodiment of a system 100, system 100D. System 100D is a specific embodiment of system 100A where the mobile device 102 and mobile device 104 are communicatively coupled by a wired connection rather than a wireless connection. Accordingly, rather than using wireless radio 116, antenna 118, wireless radio 120, and antenna 122 to communicate between the mobile device 102 and mobile device 104, mobile device 102 includes a port 134 and mobile device 104 includes a port 136 where port 134 and port 136 are communicatively coupled with a wired media 138. System 100D includes similar components to system 100A and operates according to similar principles and methods as system 100A described above.

Figure 2:
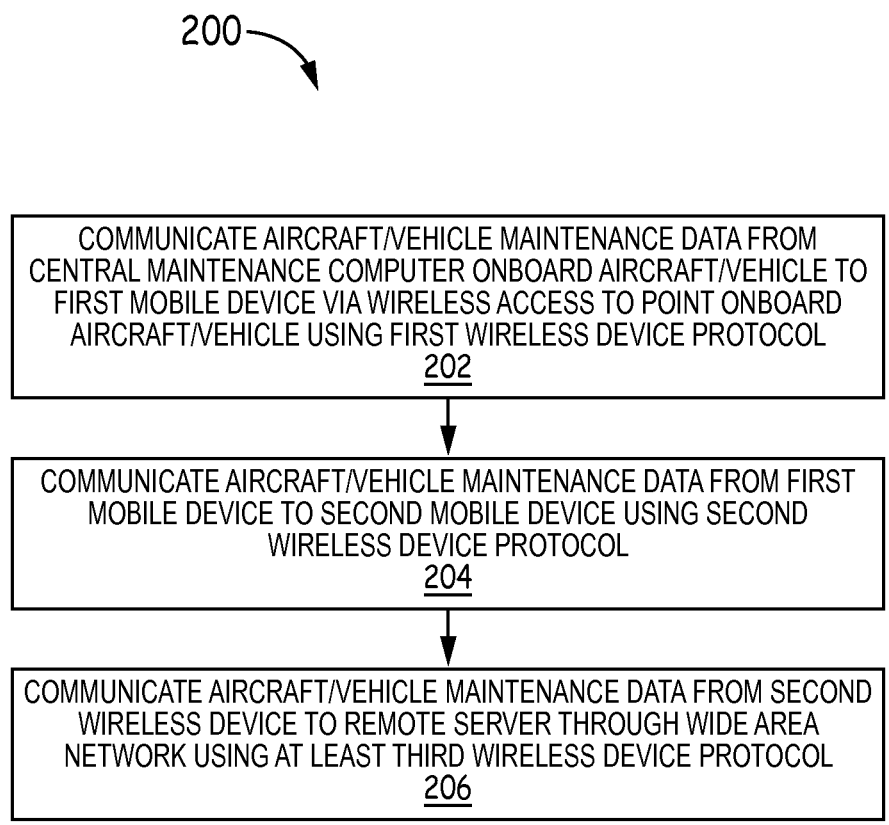
FIG. 2 is a flow chart illustrating an exemplary method for communicating maintenance information from a central maintenance computer onboard an aircraft/vehicle to a remote server using two mobile devices communicatively coupled together.

FIG. 2 is a flow chart illustrating an exemplary method 200 for communicating maintenance information from a central maintenance computer onboard an aircraft/vehicle (such as central maintenance computer 132 onboard aircraft 106 described above) to a remote server (such as remote server 108 described above) using two mobile devices communicatively coupled together (such as mobile device 102 and mobile device 104 described above).

Exemplary method 200 begins at block 202 with communicating aircraft maintenance data from a central maintenance computer onboard an aircraft (or other vehicle) to a first mobile device via a wireless access point onboard the aircraft (or other vehicle) using a first wireless device protocol. Exemplary method 200 proceeds to block 204 with communicating the aircraft/vehicle maintenance data from the first mobile device to a second mobile device using a second wireless device protocol. Exemplary method 200 proceeds to block 206 with communicating aircraft/vehicle maintenance data from a second wireless device to a remote server through a wide area network using at least a third wireless device protocol 206.

Any of mobile device 102, mobile device 104, remote server 108, wireless access point 128, and/or central maintenance computer 132 may include a processing unit, processor, digital signal processor (DSP), digital processor, etc. that includes or functions with software programs, firmware or other computer readable instructions for carrying out various methods, process tasks, calculations, and control functions, used in the integrated radio navigation receivers, systems, and methods described above. These instructions are typically stored on any appropriate computer readable medium (such as, but not limited to, memory) used for storage of computer readable instructions or data structures. The computer readable medium can be implemented as any available media that can be accessed by a general purpose or special purpose computer or processor, or any programmable logic device. Suitable processor-readable media may include non-transitory storage or memory media such as magnetic or optical media. For example, non-transitory storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a system comprising: a first mobile device having a first wireless radio and a second wireless radio; a second mobile device having a third wireless radio and a fourth wireless radio; wherein the first wireless radio of the first mobile device is configured to communicate wirelessly with the third wireless radio of the second mobile device; wherein the third wireless radio of the second mobile device is configured to communicate wirelessly with the first wireless radio of the first mobile device; wherein the second wireless radio of the first mobile device is configured to communicate at least in part wirelessly with a central maintenance computer of a vehicle; and wherein the fourth wireless radio of the second mobile device is configured to communicate at least in part wirelessly with a remote server.

Example 2 includes the system of Example 1, wherein the first mobile device receives encoded data from the central maintenance computer; wherein the first mobile device communicates at least a first portion of the encoded data to the second mobile device; and wherein the second mobile device communicates at least a second portion of the first portion of encoded data to the remote server.

Example 3 includes the system of Example 2, wherein the remote server decodes the encoded data and communicates decoded data back to the second mobile device.

Example 4 includes the system of any of Examples 2-3, wherein the second mobile device receives decoded data back from the remote server.

Example 5 includes the system of any of Examples 1-4, wherein the second wireless radio of the second mobile device is configured to communicate wirelessly with the central maintenance computer of the vehicle using a wireless access point positioned at the vehicle and via a private network.

Example 6 includes the system of any of Examples 1-5, wherein the first wireless radio of the first mobile device is configured to communicate wirelessly with the third wireless radio of the second mobile device using a Bluetooth protocol; wherein the third wireless radio of the second mobile device is configured to communicate wirelessly with the first wireless radio of the first mobile device using the Bluetooth protocol; wherein the second wireless radio of the first mobile device is configured to communicate wirelessly with the central maintenance computer of the vehicle using a WiFi connection; and wherein fourth wireless radio of the second mobile device is configured to communicate wirelessly with the remote server using at least one of a WiFi connection and a cellular data connection.

Example 7 includes the system of any of Examples 1-6, wherein the first mobile device is at least one of a tablet and a smartphone; and wherein the second mobile device is a head-mounted device.

Example 8 includes the system of any of Examples 1-7, wherein the first mobile device is a head-mounted device; and wherein the second mobile device is at least one of a tablet and a smartphone.

Example 9 includes the system of any of Examples 1-8, wherein the fourth wireless radio of the second mobile device is configured to communicate at least in part with the remote server across a wide area network; and wherein the wide area network includes at least a portion via the Internet.

Example 10 includes a method comprising: communicating vehicle maintenance data from a central maintenance computer onboard a vehicle to a first mobile device via a wireless access point onboard the vehicle using a first wireless device protocol; communicating the vehicle maintenance data from the first mobile device to a second mobile device using a second wireless device protocol; and communicating the vehicle maintenance data from the second wireless device to a remote server through a wide area network using at least a third wireless device protocol.

Example 11 includes the method of Example 10, further comprising: decoding the vehicle maintenance data at the remote server; and communicating decoded vehicle maintenance data from the remote server to the second wireless device through the wide area network using at least the third wireless device protocol.

Example 12 includes the method of any of Examples 10-11, wherein the first wireless device protocol is WiFi; wherein the second wireless device protocol is Bluetooth; and wherein the third wireless device protocol is at least one of WiFi and a cellular data protocol.

Example 13 includes the method of any of Examples 10-12, wherein the first mobile device is at least one of a tablet and a smartphone; and wherein the second mobile device is a head-mounted device.

Example 14 includes the method of any of Examples 10-13, wherein the first mobile device is a head-mounted device; and wherein the second mobile device is at least one of a tablet and a smartphone.

Example 15 includes the method of any of Examples 10-14, wherein the wide area network is the Internet.

Example 16 includes a mobile device having a first wireless radio and a second wireless radio; wherein the first wireless radio is configured to communicate wirelessly with a third wireless radio of a second mobile device; wherein the second wireless radio is configured to communicate wirelessly with a wireless radio onboard a vehicle; wherein the second wireless radio of the mobile device is configured to receive vehicle maintenance data from a central maintenance computer onboard the vehicle through the wireless radio onboard the vehicle; wherein the first wireless radio of the mobile device is configured to communicate the vehicle maintenance data to the third wireless radio of the second mobile device; and wherein the second mobile device is configured to forward the vehicle maintenance data to a remote server across a wide area network.

Example 17 includes the mobile device of Example 16, wherein the first wireless radio of the first mobile device is configured to communicate wirelessly with the third wireless radio of the second mobile device using a Bluetooth protocol; wherein the second wireless radio of the first mobile device is configured to communicate wirelessly with the wireless radio onboard the vehicle using a WiFi connection; and wherein the second mobile device is configure to forward the vehicle maintenance data to the remote server at least in part using at least one of a WiFi connection and a cellular data connection.

Example 18 includes the mobile device of any of Examples 16-17, wherein the mobile device is at least one of a tablet and a smartphone; and wherein the second mobile device is a head-mounted device.

Example 19 includes the mobile device of any of Examples 16-18, wherein the mobile device is a head-mounted device; and wherein the second mobile device is at least one of a tablet and a smartphone.

Example 20 includes the mobile device of any of Examples 15-19, wherein the wide area network is the Internet.

What is claimed is:

1. A system comprising:
   a first mobile device having a first wireless radio and a second wireless radio;
   a second mobile device having a third wireless radio and a fourth wireless radio;
   wherein the first wireless radio of the first mobile device is configured to communicate wirelessly with the third wireless radio of the second mobile device;
   wherein the third wireless radio of the second mobile device is configured to communicate wirelessly with the first wireless radio of the first mobile device;
   wherein the second wireless radio of the first mobile device is configured to communicate at least in part wirelessly with a central maintenance computer of a vehicle;
   wherein the fourth wireless radio of the second mobile device is configured to communicate at least in part wirelessly with a remote server;
   wherein the first mobile device is configured to receive data from the central maintenance computer via the second wireless radio;
   wherein the first mobile device is configured to communicate the data to the second mobile device via the first wireless radio;
   wherein the second mobile device is configured to receive the data from the first mobile device via the third wireless radio; and
   wherein the second mobile device is configured to communicate the data to the remote server via the fourth wireless radio.

2. The system of claim 1, wherein the data is encoded data.

3. The system of claim 2, wherein the remote server is configured to decode the encoded data and communicate decoded data back to the second mobile device.

4. The system of claim 2, wherein the second mobile device is configured to receive decoded data back from the remote server.

5. The system of claim 1, wherein the second wireless radio of the second mobile device is configured to communicate wirelessly with the central maintenance computer of the vehicle using a wireless access point positioned at the vehicle and via a private network.

6. The system of claim 1, wherein the first wireless radio of the first mobile device is configured to communicate wirelessly with the third wireless radio of the second mobile device using a Bluetooth protocol;
   wherein the third wireless radio of the second mobile device is configured to communicate wirelessly with the first wireless radio of the first mobile device using the Bluetooth protocol;
   wherein the second wireless radio of the first mobile device is configured to communicate wirelessly with the central maintenance computer of the vehicle using a WiFi connection; and
   wherein fourth wireless radio of the second mobile device is configured to communicate wirelessly with the remote server using at least one of a WiFi connection and a cellular data connection.

7. The system of claim 1, wherein the first mobile device is at least one of a tablet and a smartphone; and
   wherein the second mobile device is a head-mounted device.

8. The system of claim 1, wherein the first mobile device is a head-mounted device; and
   wherein the second mobile device is at least one of a tablet and a smartphone.

9. The system of claim 1, wherein the fourth wireless radio of the second mobile device is configured to communicate at least in part with the remote server across a wide area network; and
    wherein the wide area network includes at least a portion via the Internet.

10. A method comprising:
    communicating vehicle maintenance data from a central maintenance computer onboard a vehicle to a first mobile device via a wireless access point onboard the vehicle using a first wireless device protocol;
    communicating the vehicle maintenance data from the first mobile device to a second mobile device using a second wireless device protocol; and
    communicating the vehicle maintenance data from the second wireless device to a remote server through a wide area network using at least a third wireless device protocol.

11. The method of claim 10, further comprising:
    decoding the vehicle maintenance data at the remote server; and
    communicating decoded vehicle maintenance data from the remote server to the second wireless device through the wide area network using at least the third wireless device protocol.

12. The method of claim 10, wherein the first wireless device protocol is WiFi;
    wherein the second wireless device protocol is Bluetooth; and
    wherein the third wireless device protocol is at least one of WiFi and a cellular data protocol.

13. The method of claim 10, wherein the first mobile device is at least one of a tablet and a smartphone; and
    wherein the second mobile device is a head-mounted device.

14. The method of claim 10, wherein the first mobile device is a head-mounted device; and
    wherein the second mobile device is at least one of a tablet and a smartphone.

15. The method of claim 10, wherein the wide area network is the Internet.

16. A mobile device having a first wireless radio and a second wireless radio;
    wherein the first wireless radio is configured to communicate wirelessly with a third wireless radio of a second mobile device;
    wherein the second wireless radio is configured to communicate wirelessly with a wireless radio onboard a vehicle;
    wherein the second wireless radio of the mobile device is configured to receive vehicle maintenance data from a central maintenance computer onboard the vehicle through the wireless radio onboard the vehicle;
    wherein the first wireless radio of the mobile device is configured to communicate the vehicle maintenance data to the third wireless radio of the second mobile device; and
    wherein the second mobile device is configured to forward the vehicle maintenance data to a remote server across a wide area network.

17. The mobile device of claim 16, wherein the first wireless radio of the first mobile device is configured to communicate wirelessly with the third wireless radio of the second mobile device using a Bluetooth protocol;
    wherein the second wireless radio of the first mobile device is configured to communicate wirelessly with the wireless radio onboard the vehicle using a WiFi connection; and
    wherein the second mobile device is configure to forward the vehicle maintenance data to the remote server at least in part using at least one of a WiFi connection and a cellular data connection.

18. The mobile device of claim 16, wherein the mobile device is at least one of a tablet and a smartphone; and
    wherein the second mobile device is a head-mounted device.

19. The mobile device of claim 16, wherein the mobile device is a head-mounted device; and
    wherein the second mobile device is at least one of a tablet and a smartphone.

20. The mobile device of claim 15, wherein the wide area network is the Internet.

* * * * *